Feb. 26, 1963    R. CARROLL    3,078,556
ADJUSTABLE CLUTCH SPRING COMPRESSOR
Filed May 16, 1960
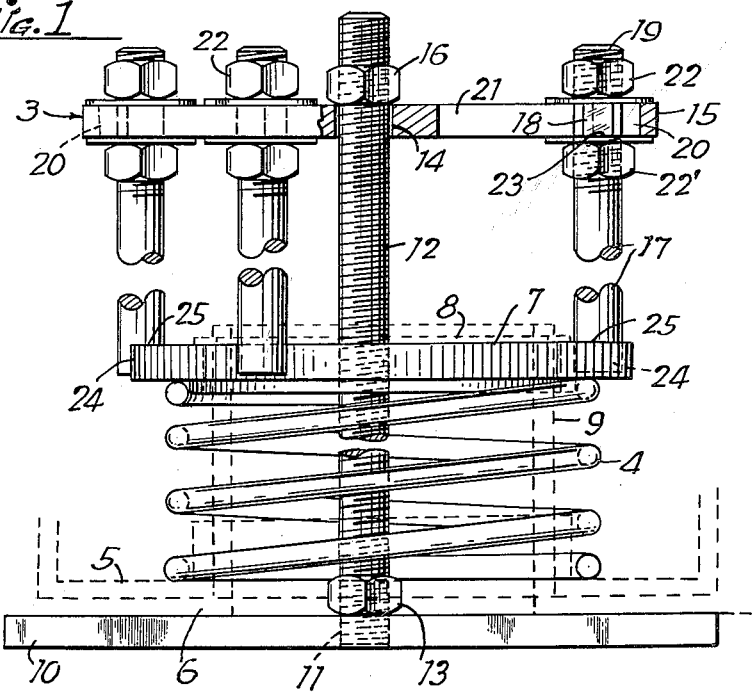
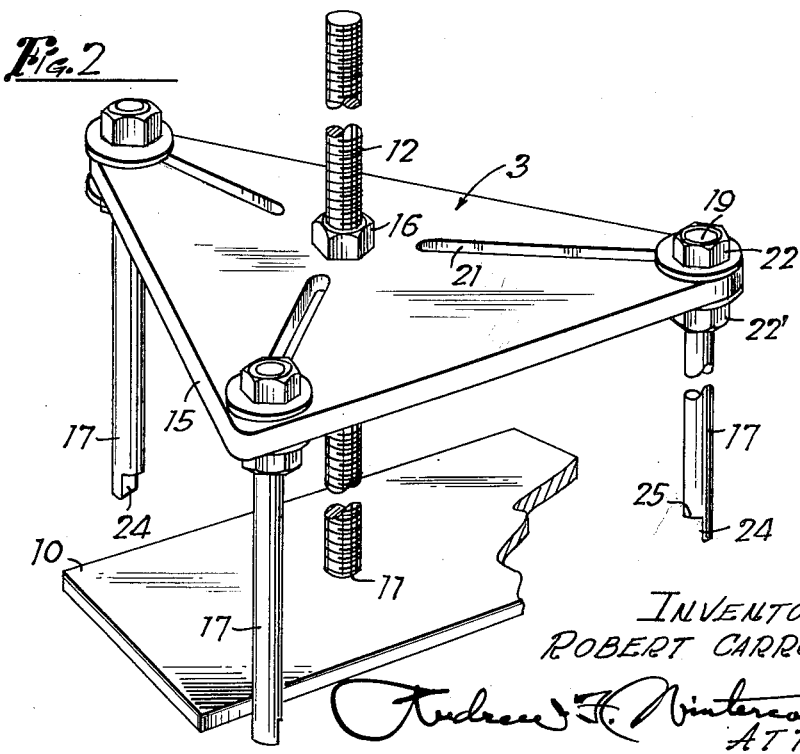
INVENTOR
ROBERT CARROLL
ATTY.

3,078,556
ADJUSTABLE CLUTCH SPRING COMPRESSOR
Robert Carroll, 1116 Chambers Ave., Peru, Ill.
Filed May 16, 1960, Ser. No. 29,550
2 Claims. (Cl. 29—226)

This invention relates to a new and improved clutch spring compressor for use by automobile mechanics in compressing the direct clutch spring in an automatic transmission by engagement with the direct clutch spring retainer ring when, in order to remove the direct clutch piston for removal and replacement of the direct clutch piston seal ring, it is necessary, first of all, to compress the direct clutch spring enough to enable removal of the retainer snap ring, and then relieve compression of the spring for removal thereof preliminary to the removal of the direct clutch piston from the direct clutch piston retainer assembly.

Heretofore, many automobile mechanics bought rather expensive tools, specially designed for the various car manufacturers, to handle just this one relatively simple service detail on the various makes of automatic transmissions. The excessive cost, however, is only one part of the difficulty; it must be remembered that each time the mechanic had this job to do on a certain make of car, he had to find the correct spring compressor for that make and remember after each job to be careful to put it back where he could find it the next time he needed it again for that particular make, and, in a large service department, where many mechanics are employed, the problem mentioned was obviously multiplied and aggravated.

It is, therefore, the principal object of my invention to provide a single relatively inexpensive and quickly and easily adjustable jig for performing the spring compressing job on the entire range of automatic transmissions, whereby to avoid the objections mentioned going with the old system and save time and money all around.

The device of my invention is illustrated in the accompanying drawings, in which—

FIG. 1 is a side view of the device showing it in use—compressing the direct clutch spring by engagement with the direct clutch spring retainer ring in an automatic transmission preliminary to the removal of the direct clutch piston after removal of the snap ring, retainer ring and spring, and FIG. 2 is a perspective view of the clutch spring compressor by itself, to better illustrate its various features.

The same reference numerals are applied to corresponding parts in these two views.

Referring to the drawing, the reference numeral 3 designates the device or jig of my invention generally and the same is shown in FIG. 1 compressing the coiled compression spring 4, which is the direct clutch spring, associated with the direct clutch piston 5, in a direct clutch piston assembly 6 of an automatic transmission for automobiles. As illustrated, the spring retainer ring 7 is engaged and forced down, compressing spring 4 enough to leave the snap ring 8 exposed on the neck 9 for easy removal, so that thereafter the retainer ring 7 can be allowed to back up in the expansion of the spring 4, and the ring 7 and spring 4 can then be removed to permit removal of the direct clutch piston 5 from assembly 6 for removal and replacement of the seal ring on the piston 5.

The spring compressing device or jig 3 comprises a rectangular bottom plate 10 having a hole 11 in the center thereof threaded to receive one end of a long screw post 12, a locknut 13 on that end of the screw being tightened against the plate to hold the screw post against turning and give it greater rigidity. At its other end, the screw post 12 extends freely through a center hole 14 in an equilateral triangular top plate 15, the aforesaid bottom plate 10 abutting the bottom of the housing 6 of the direct clutch piston retainer assembly while screw post 12 extends through the central neck 9 of said housing to serve as a center post or guide for the top plate 15, as seen in FIG. 1, top plate 15 being disposed in spaced parallel relationship to and above the retainer ring 7, against which pressure is to be applied by tightening a nut 16 threaded on screw post 12 disposed in abutment with the top plate 15. Two or more screw posts 12 may, if desired, be provided, of different lengths to suit different lengths of necks 9 on assemblies 6 on different makes or models of automatic transmissions. Three push-pins 17 are slideably but nonrotatably adjustably mounted in parallel relationship to one another by means of the flats 18 provided on their threaded ends 19 which are entered first through the enlarged circular ends 20 of the three radial slots 21 provided in the top plate and then adjusted to the desired radius in said slots before being clamped by means of nuts 22, the flat portions 18 being milled wide enough to accommodate the thickness of plate 15 and at the same time define square shoulders 23 for clamping abutment on the bottom of top plate 15 alongside the slots 21 when the nuts 22 are tightened against the top of said top plate. Other nuts 22' may also be threaded on pins 17 to bear against the bottom of top plate 15 to assure greater rigidity of the pins. Right angle notches 24 are provided in the other end of said push-pins 17 on their inner sides for locating abutment on the periphery of the retainer ring 7 at three equally circumferentially spaced points, the right angle shoulders 25 at the inner ends of the notches 24 transmitting the pressure to the ring 7 when the nut 16 is tightened, whereby to force the ring 7 away from the snap ring 8. The pins 17, once the notched ends 24 have been engaged on the periphery of the retainer ring 7 and the nuts 22 have been tightened, are not apt to slip off, even if the surfaces have oil on them.

In operation, the mechanic, having located the screw 12 approximately in the center of neck 9, can thereafter easily adjust the push-pins 17 radially of the top plate 15 in slots 21 and engage the notched ends 24 on the periphery of the retainer ring, and then tighten clamp nuts 22 and 22' to hold them in adjusted position securely gripping the retainer ring between their notched ends, after which it is a simple matter to compress the spring 4 enough to gain access to the snap ring 8 for its removal. Then the nut 16 can be loosened until spring 4 is fully expanded, after which the jig 3 is removed and the ring 7 and spring 4 are removed, preliminary to the removal of piston 5 for inspection and removal and replacement of its seal ring, if necessary. Jig 3 is used again, after replacement of the piston 5, for reassembly of spring 4, retainer ring 7, and snap ring 8, the push-pins 17 being, of course, left as previously adjusted on top plate 15 for this second operation.

It should be clear that the present jig 3 means a large saving in the cost of equipment needed for compressing springs in automobile automatic transmissions, because this one jig is adjustable easily to fit most, if not all, automatic transmissions, especially if two or more screw posts 12 of different lengths are provided. It represents a big saving in time also, because a mechanic can keep this one jig handy at all times for repeated and wide scale use, whereas with the old procedure he had to have a large number of spring compressors available, all properly tagged or boxed and filed in a certain order for easier finding when needed, and care had to be taken after each job to replace whatever special jig was used in its proper place or much more time would be lost in locating it again the next time it was needed. Confusion and much wasting of time were bound to occur, especially in a shop employing a number of mechanics where some are not careful to replace the special jigs properly each time they are used, and leave them on the floor or on benches at various places around a shop. Each mechanic of a group can be provided with his own jig 3 made in accordance with my invention, actually at less cost per shop than where a single set of the old style spring compressors was provided, and a great saving in time and effort is realized.

It is believed the foregoing description conveys a good understanding of the objects and advantages of my invention. The appended claims have been drawn to cover all legitimate modifications and adaptations.

What I claim is:

1. A device of the character described for use in compressing a coil compression spring in an automatic transmission by means of a retainer ring in order to gain access to and remove a snap ring from behind the retainer ring on a neck in the housing of said transmission preliminary to removal of a clutch piston for inspection and repair purposes, said device comprising a bottom plate adapted for abutment with the back of the housing in parallel relation to said retainer ring, an elongated screw post fixed at one end to the bottom plate and adapted to extend centrally through the neck of said housing to a plane parallel to but beyond the retainer ring, a top plate having a center hole provided therein through which the screw post extends freely, a nut threaded on said screw post and engaging said top plate to force it toward said bottom plate, said top plate having a plurality of angularly spaced slots provided therein in radial relationship to said center hole, and a plurality of push-pins of equal length, one for each of said radial slots, disposed in right angle relationship to said top plate with one end entered in the slots for radial adjustment relative to said plate while held against turning with respect thereto, the other end of each of said pins having a right angle notch provided therein on the inner side for engagement on the periphery of the retainer ring and abutment against the back thereof, whereby to subject the compression spring to compression in the tightening of the aforesaid nut and thereby force the retainer ring away from the snap ring to permit removal of the snap ring and thereafter provide support for said retainer ring while it is being backed up by loosening of said nut to relieve compression of said spring, the end of each push-pin that is slideably, but nonrotatably, engaged in the radial slot, being threaded and including a shoulder for abutment with the bottom of said top plate alongside the slot, and a nut threading on the end portion of said pin and engaging the top of said top plate alongside the said slot to force said pin endwise in a direction to press the shoulder against the plate to clamp the pin in adjusted position.

2. A device as set forth in claim 1 including still another nut threaded on the end portion of each pin and engaging the bottom of said top plate alongside the slot to further clamp the pin in adjusted position and give it greater rigidity.

References Cited in the file of this patent

UNITED STATES PATENTS

| | | |
|---|---|---|
| 620,366 | Salenius | Feb. 18, 1899 |
| 1,607,592 | Marciano et al. | Nov. 16, 1926 |
| 1,826,631 | Payne | Oct. 6, 1931 |
| 2,485,022 | Taylor | Oct. 18, 1949 |
| 2,677,174 | Lee | May 4, 1954 |
| 2,964,841 | Farris | Dec. 20, 1960 |

FOREIGN PATENTS

| | | |
|---|---|---|
| 722,739 | France | Jan. 4, 1932 |